United States Patent Office 2,979,499
Patented Apr. 11, 1961

2,979,499

DERIVATIVES OF WATER-SOLUBLE GUMS

William H. McNeely, San Diego, Calif., assignor to Kelco Company, San Diego, Calif., a corporation of Delaware No Drawing. Filed Mar. 11, 1954, Ser. No. 415,707

4 Claims. (Cl. 260—209.6)

This invention relates to certain compounds of alginic acid, which compounds are soluble in polyhydric alcohols such as ethylene, diethylene and propylene glycol, glycerine and the like, and in monhydric alcohols such as methanol, ethanol and isopropanol. This is a continuation-in-part of my application filed November 6, 1950, Serial Number 194,397, now abandoned.

A purpose of the invention is to provide an agent for increasing the viscosity of a polyhydric alcohol and for imparting viscosity to a monohydric alcohol.

A purpose of the invention is to provide an agent for the control of viscosity and penetration in printing inks, lacquers and varnishes having an alcoholic solvent or vehicle.

A purpose of the invention is to provide an agent for thickening an alcoholic vehicle for dyes in the manufacture of textile vat color pastes.

A purpose of the invention is to provide an agent for rendering radiator antifreeze compounds more resistant to creeping through-hose and gasket connections.

The water-soluble salts of alginic acid (the salts of the alkali metals, magnesium and ammonium) are ideal agents for imparting viscosity to aqueous liquids but are totally insoluble in the mono- and polyhydric alcohols. This property of the water-soluble alginates is so far developed that they may be precipitated from aqueous solution by the addition of relatively small proportions of the water-miscible alcohols.

It follows that, while they are useful in the fabrication of textile print pastes, paints and inks in which water is used as the vehicle, they are totally useless in compositions in which the vehicle consists largely of a monohydric or polyhydric alcohol. It is well known, for example, that the alkali metal salts of alginic acid cannot be used for bodying aniline and gravure inks which contain thirty percent or more of a monohydric alcohol such as ethanol, since this concentration of alcohol causes gelation of the alginate and its partial precipitation from solution.

There are numerous uses in which it is desirable to increase the viscosity of a glycol of low molecular weight, such as ethylene glycol. For example, the glycols are extensively used as hydraulic pressure fluids and as lubricants for special purposes, but have the disadvantage that because of their relatively low viscosity it is dfficult to arrange packings to retain them at high pressure. The compounding of the lower glycols with a glycol-soluble alginate permits the viscosity of the glycol to be increased to any desired extent. Such compositions are particularly adapted to use at very low temperatures, as in aircraft, for the reason that the viscosity lost in diluting with water or alcohol to the point at which the freezing point is at the minimum, may be restored by the addition of the alginate and may be increased as far as may be desired.

I have discovered that alginates soluble in the lower monohydric and polyhydric alcohols may be prepared by reacting alginic acid with certain of the lower quaternary ammonium hydroxides, to wit: benzyltrimethylammonium hydroxide, phenyltrimethylammonium hydroxide and tetraethanolammonium hydroxide. The higher quaternary ammonium hydroxides, containing more than ten carbon atoms, do not yield useful products.

The products of these reactions are colorless or yellowish solids, capable of subdivision to form powders which are stable to heat and light. The products of reaction with the first two bases named are soluble in water, ethanol, glycerine, ethylene glycol, propylene glycol and diethylene glycol. The product of reaction with tetraethanolammonium hydroxide is insoluble in propylene or diethylene glycol but soluble in water and in aqueous solutions containing a high percentage of the aforementioned alcohols.

In preparing these products the quaternary hydroxide in aqueous solution, preferably at from 30% to 40% concentration, may be reacted directly with an alginic acid of, preferably, from 20% solids upwardly. The reaction takes place readily with some evolution of heat, the mixture of reactants being pugged actively until the reaction is complete. The reacted mass, which may be a paste or a solution, according to the quantity of water present, is then dried at a moderate temperature, for example from 110° to 200° Fahr., until the proportion of water is sufficiently low to permit the product to be ground to a powder. Ordinarily the product will have to be brought to at least 90% solids to make it brittle enough to grind.

EXAMPLE 1

*Preparation of benzyltrimethylammonium alginate*

6530 grams moist alginic acid (32.5% solids, 0.4% ash, equivalent weight by titration 205) equivalent to 2120 grams or 10.36 gram molecules of alginic acid, was fluffed for thirty minutes in a stainless steel incorporator. 4395 grams of a 40% solution of benzyltrimethylammonium hydroxide (found by titration to contain 2.36 gram moles per kilogram) equivalent to 10.36 gram moles was added in portions over a period of two hours, allowing time for each portion to become thoroughly blended before adding the next.

The sticky reaction product was dried by spreading in thin sheets and heating at 135° Fahr. for about eight hours. The dried product is somewhat hygroscopic and should be protected from absorption of atmopheric moisture. The product actually realized, dried to 94.5% solids, amounted to 3460 grams or about 85% of the theoretical yield.

The powder produced by grinding to pass a 40 mesh screen was readily and freely soluble in water and all of the lower alcohols containing a slight amount of water, yielding smooth-flowing solutions. Its effect on viscosity is illustrated by the following comparison:

Viscosity of 2% aqueous solution at 26° C.=500 cps.
Viscosity of 2% ethylene glycol solution=10,700 cps.
Viscosity of ethylene glycol per se, about 17 cps.

EXAMPLE 2

*Preparation of phenyltrimethylammonium alginate*

3800 grams moist alginic acid (34% solids, 0.5% ash, equivalent weight 205) equivalent to 1290 grams or 6.31 gram moles actual alginic acid, was reacted in the manner described under Example 1 with 5220 grams of an 18.5% aqueous solution of phenyltrimethylammonium hydroxide, equivalent to 965 grams or 6.31 gram moles of the base.

The product was dried in the manner above described, to 92% solids, the yield being 2080 grams or about 85% of the theoretical.

The product, when ground to pass 40 mesh, had the same solubilities as the product of Example 1, but was made from an alginic acid of slightly lower viscosity-producing power and consequently had somewhat less effect in increasing the viscosity of solvents, as shown by the figures following:

Viscosity of 2% aqueous solution=450 cps.
Viscosity of 2% ethylene glycol solution=7,800 cps.
Viscosity of ethylene glycol at 26° C., about 17 cps.

This product had a pH value in 1¼% aqueous solution of 8.0.

The quaternary ammonium hydroxides may be obtained commercially as such or may be prepared by well known chemical reactions (Fieser and Fieser, Organic Chemistry, 1944, p. 229). The alginic acid should preferably be of low ash content, as for example 0.5% or less, as the metallic alginates are wholly insoluble in the alcohols. This precaution is essential if the alcoholic solution of the alginate must be clear and have smooth flowing properties. But as the readiness of solution is not reduced by the presence of a small proportion of an insoluble alginate, a less pure acid may be used if the use to which the product is to be put will tolerate a cloud, or floating specks of undissolved matter. Where a use of this type is contemplated, it may be desirable to add a small proportion of an alcohol-insoluble alginate, such as ammonium alginate, to facilitate the drying step.

The acid should also be selected with a view to the extent to which it is desired to develop the viscosity-producing characteristic of the product. As the ability to increase the viscosity of the solvent medium is usually the most useful property of these products, the acid selected will ordinarily be of the high-viscosity type, i. e., one which had been depolymerized as little as possible during its manufacture. There are some uses, however, in which it may be desirable to increase the solids content of the solution (by adding an increased proportion of the alginate) without unduly increasing the viscosity, and for such uses a low-viscosity, more fully depolymerized acid will be selected.

In proportioning the reactants it is preferable to use the stoichiometric quantities. The equivalent weight of low ash, commercial alginic acid may be assumed at about 205, but it is better to determine the actual equivalent weight for each reaction, as by titration with a standardized base, for example N/3 sodium hydroxide. I have found that if more than about 5% of the carboxyl groups of the alginic acid remain unreacted, the solubility in the alcohols is impaired and may be incomplete. On the other hand, if more than about 5% excess of the base be present it will be difficult to dry the reaction product.

The ability to impart viscosity to the alcohols, which is the most useful characteristic of the new quaternary ammonium alginates described herein, is not displayed by the alkali metal, ammonium and magnesium alginates, or by the glycol alginates. These previously known algins, when in solid form, are readily soluble in water but do not dissolve in water containing as little as 25% of the monohydric alcohol such as ethanol or isopropanol. Or if one of these known algins be first dissolved in water and ethanol added to the aqueous solution, viscosity begins to be lost (by fractional coagulation of the alginate) at a water:alcohol ratio of about 70:30, and the alginate is completely precipitated when this ratio reaches about 50:50.

By contrast, the benzyl- and phenyl-trimethyl-ammonium alginates are completely soluble in a lower alcohol (monohydric or polyhydric) containing a slight amount of water, and are not precipitated from aqueous solution by the addition of alcohol in substantially any proportion. For example, these new alginates dissolve completely and yield a clear solution in 95% ethanol (5% water) and dissolve in 100% ethanol to produce a solution of only slight graininess. Thus it is possible to prepare solutions of these new algins in solvents containing water, a monohydric and/or a polyhydric alcohol in any desired proportion.

The solutions thus obtained will also tolerate the addition of a considerable proportion of a nonpolar solvent which is miscible with the alcohol. Thus, for example, the addition of an equal volume of benzene to a solution of a quaternary ammonium alginate in 95% ethanol failed to precipitate the algin or to make any greater reduction in viscosity than that normally following from dilution with a nonviscous solvent.

Glycol solutions of benzyl- and phenyl-trimethyl ammonium alginate may be further diluted with other glycols or solvents in which the alginate is less freely soluble: for example, triethylene glycol, acetone, "Carbitol" (diethylene glycol monoethyl ether) or "Cellosolve" (ethylene glycol monoethyl ether) without causing precipitation of the alginate or destroying its usefulness in the solution, even when added in large proportion. This fact is of importance in the fabrication of special varnishes, in which a wide variety of solvents are used to dissolve the resins on which the varnish is based.

The new alginates are distinguished from the well known amine alginates both in chemical behavior and in respect to solubility.

Chemically, the quaternary ammonium alginates are strong bases and resist decomposition in the presence of alkalis, while the amine alginates behave as weak bases and are readily decomposed in alkaline solution to form the free amine and a metallic salt of alginic acid. This compatibility with alkalis widely extends the field of usefulness of the new products.

As regards solubilities, some of the amine alginates (e.g., triisopropanolamine alginate) are soluble in ethylene glycol and glycerine and are highly useful in compositions containing these alcohols, but are insoluble in diethylene and propylene glycols. As the benzyl- and phenyl-trimethylammonium alginates are fully soluble in these latter alcohols they have an unique utility in improving the body and film-forming property of the types of steam-set printing ink having diethylene glycol as the major or sole vehicle.

The quaternary ammonium alginates are also useful in aiding the suspension and maintaining the body of vat color pastes in which the vehicle consists in large proportion of either ethylene glycol or glycerine. A small proportion of one of these algins dissolved in ethylene or propylene glycol will likewise improve the viscosity or body of a solution of glycol in water, making such a solution more useful as a circulating cooling fluid by improving the resistance to leaking or creeping through hose or gasket connections.

TABLE 1.—IDENTIFICATION OF REACTANTS

| Reference Letter | Name of Acid | Comb. Wt. |
| --- | --- | --- |
| A | Alginic | 205 |

| Reference Numeral | Name of Base | Comb. Wt. |
| --- | --- | --- |
| 1 | Phenyltrimethylammonium hydroxide | 153 |
| 2 | Benzyltrimethylammonium hydroxide | 167 |
| 3 | Tetraethanolammonium hydroxide | 211 |

The reaction between acid and base occurs readily on admixture in the presence of enough water to maintain the mass at stirrable consistency, and proceeds rapidly, usually without the application of external heat. The reaction products are dried and ground to the fineness best adapted to the specific use to which each is to be put. The above noted precautions as to the use of quantities closely approaching the stoichiometric proportions should be observed.

The properties of a number of these products are set forth in abbreviated form in Table 2, in which the letter or figure in the first column indicates, by reference to Table 1, the combination of acid and base used in forming the salt (e.g., A–1 is the phenyltrimethyl ammonium hydroxide salt of alginic acid, etc.). The letter S indicates the sodium salt (e.g., A–S is the sodium salt of alginic acid), the properties of the sodium salts being inserted for comparison only. The "alcohol tolerance" of the second column indicates the maximum percentage of ethanol, as referred to the total liquid quantity, that may be present in an aqueous liquid in which the product will dissolve to such extent as to thicken the solution appreciably; the "appearance" in the third column is that of a 2% solution of the salt in ethylene glycol, and the "viscosity" is that of the same solution, in centipoises.

TABLE 2.—PROPERTIES OF PRODUCTS

| Product | Alcohol Tolerance, percent | Appearance of 2% solution | Viscosity |
|---|---|---|---|
| A-1 | 100 | Clear, smooth flowing | 7,800 |
| A-2 | 100 | do | 10,700 |
| A-3 | 40 | Cloudy, granular flow | |
| A-S | 30 | No solution | 20 |

I claim as my invention:

1. An alcohol-soluble and glycol-soluble dry gum, said gum being the salt of a radical $R^a$ with a radical $R^b$, in which $R^a$ is the anion of alginic acid and $R^b$ is the cation of a quaternary ammonium hydroxide containing not more than ten carbon atoms said cations being present in not less than 5% below or more than 5% above the stoichiometric amount of said anion.

2. A salt as recited in claim 1, in which $R^b$ is the cation of benzyltrimethylammonium hydroxide.

3. A salt as recited in claim 1, in which $R^b$ is the cation of phenyltrimethylammonium hydroxide.

4. A salt as recited in claim 1, in which $R^b$ is the cation of tetraethanolammonium hydroxide.

References Cited in the file of this patent

UNITED STATES PATENTS

| | | |
|---|---|---|
| Re. 22,650 | Bley | June 12, 1945 |
| 2,158,485 | Preble | May 16, 1939 |

FOREIGN PATENTS

| | | |
|---|---|---|
| 939,545 | France | Apr. 26, 1948 |